March 25, 1924.

J. G. A. STRANDELL

CONNECTER

Filed Oct. 30, 1920 2 Sheets-Sheet 1

1,488,175

Inventor:
Johannes G. A. Strandell,
By Dyrenforth, Lee, Chritton & Wiles
Attys.

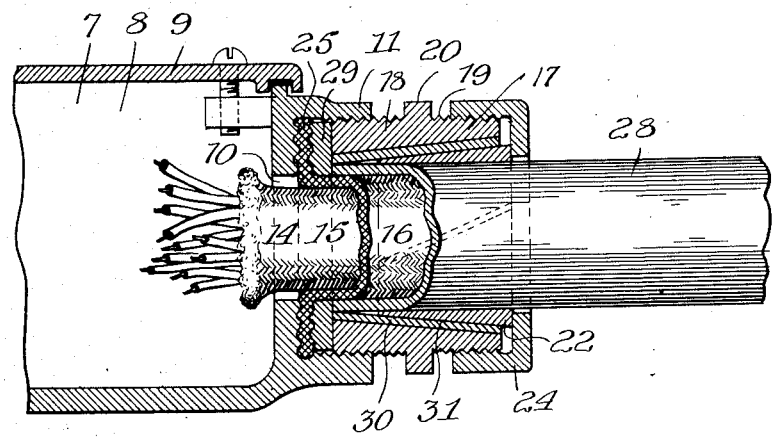
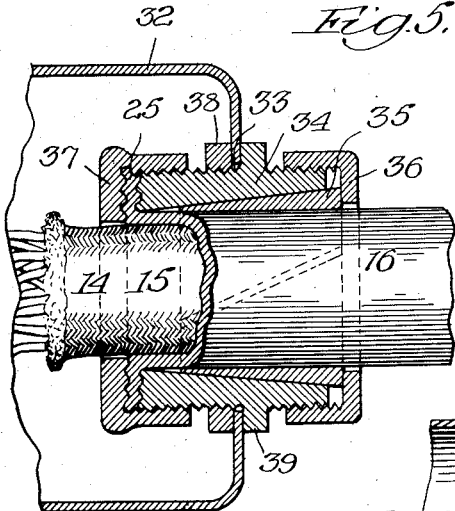
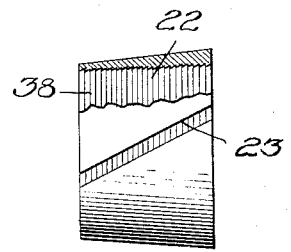
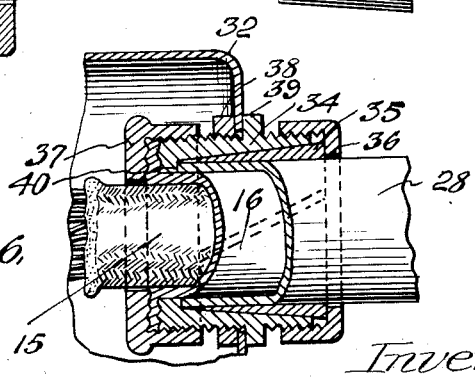

Patented Mar. 25, 1924.

1,488,175

UNITED STATES PATENT OFFICE.

JOHANNES G. A. STRANDELL, OF CHICAGO, ILLINOIS.

CONNECTER.

Application filed October 30, 1920. Serial No. 420,701.

*To all whom it may concern:*

Be it known that I, JOHANNES G. A. STRANDELL, a citizen of the United States, residing at 6935 South Laflin St., Chicago, in the county of Cook and State of Illinois, have invented a new and useful Improvement in Connecters, of which the following is a specification.

My invention relates more particularly to improvements in means for connecting electric wires, cables, or conduits carrying them, to terminal boxes or other fittings, such wires and cables commonly being sheathed in various ways, as for example, by lead-sheeting, tape, or jute, the latter saturated with a water-proofing compound. One of my primary objects is to provide for the secure fastening of the wire, cable, or conduit to terminal boxes or other fittings and provide for the rendering of the joint therebetween, water tight, and to accomplish this by a novel, simple and inexpensive construction. Another object is to provide in connection with securing means for the wire, cable, or conduit, a reducer member whereby wires, cables or conduits of different dimensions may be properly secured in position in the box. Another object is to provide a construction by which the proper securing of the wires, cables and conduits to terminal boxes may be effected, where the box is improvided with a boss, as for example when it is made of sheet metal; and other objects as will be manifest from the following description.

Figure 1:
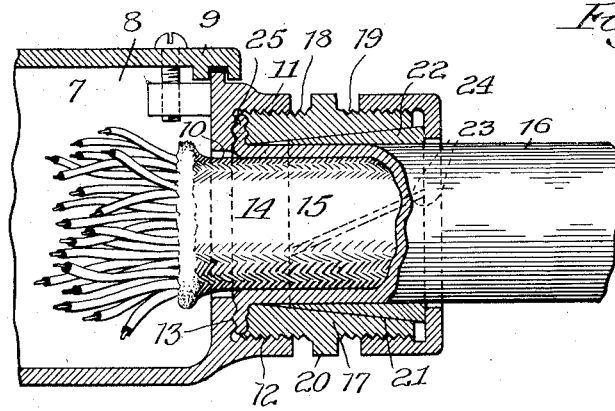
Figure 2:
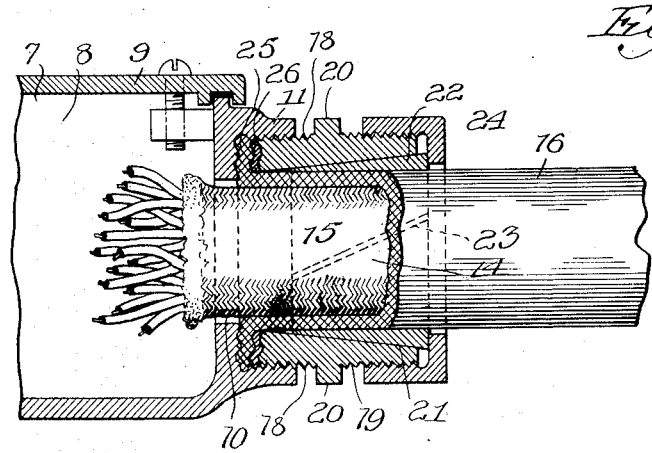
Figure 3:
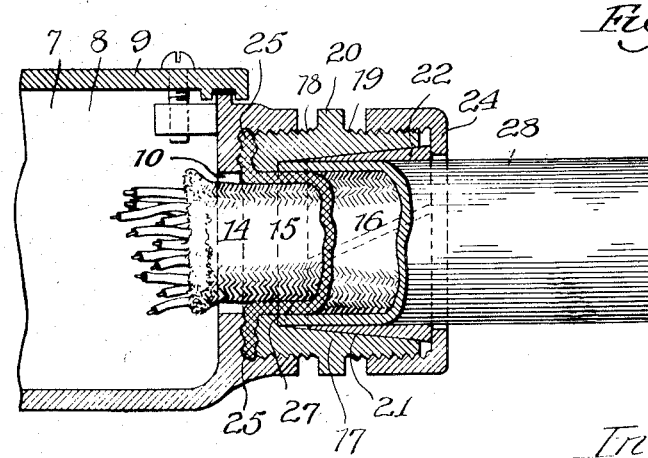

Referring to the accompanying drawing, Figure 1 is a view in longitudinal sectional elevation of a part of a terminal box with an electric cable connected with one end of the box by means constituting one embodiment of my invention, this construction being especially adapted for use where the cable is sheathed at its exterior surface with metal, as for example, sheet lead. Figure 2 is a similar view of another embodiment of the invention showing it as particularly adapted for use where the exterior sheathing of the cable is in the form of fabric. Figure 3 is a similar view of another embodiment of the invention especially adapted for use with cables enclosed in relatively rigid pipes, such as those made of steel and with a sheathing for the cable. Figure 4 is a similar view illustrating the reduced feature of the invention. Figure 5 is a similar view showing my invention as applied to a terminal box formed of sheet metal and in which the cable securing means are formed separately from the box. Figure 6 is a view like Fig. 5 of a further modification of the invention; and Figure 7, a view in side elevation of the split wedge ring employed in all of the constructions of the preceding figures, a portion thereof being broken away to disclose the preferred form in which the inner surface is provided.

Referring to Figs. 1, 2, 3 and 4, a terminal box in connection with which the invention is illustrated, is represented at 7, this box as shown being in the form of a casting adapted to be closed at its open side 8, by a suitable cover plate 9. The end shown of the box, is apertured as indicated at 10 for receiving the electric wires, and cast integrally with this end of the box is a hollow boss 11 internally screw-threaded as represented at 12, the diameter of the screw-threaded portion 12 being considerably greater than that of the opening 10 whereby an annular seating surface 13 surrounding the opening 10 is provided, this surface being preferably corrugated as represented.

Referring now more particularly to Fig. 1, the electric cable to be secured to the box 7 is represented at 14, it being shown as made up of a number of wires housed within the woven covering 15, the cable being provided about its exterior surface with a sheathing 16 of metal, as for example, lead.

Co-operating with the threaded boss member 11, is a tubular member 17 which is screw-threaded at its opposite ends as represented at 18 and 19, the intermediate portion represented at 20 being shaped as desired preferably for engagement therewith of any suitable wrench or other tool, for tightening the member 17 in the boss 11. The opening in the member 17 which extends therethrough from end to end, is represented at 21, the wall of this opening being of conical form as represented, the flare of this wall being from the left toward the right hand side of Fig. 1. The conical wall 21 is spaced from the sheathing 16 and in this space is located a clamping ring 22 split diagonally relative to the median line of the ring, as represented at 23, the inner surface of this ring being cylindrical and its outer surface conical as represented. The ring 22 cooperates with a compression cap 24 which surrounds the sheathing 16, screws upon the threaded portion 19 of the member 17 and operates by engaging the outer end of the ring 22 to force the latter along the conical surface 21 and into rigid clamping engagement with the sheathing 16, the ring 22 contracting as it is forced inwardly by the screwing of the cap 24 upon the member 17. The inner end of the sheathing 16 is bent or deflected radially outward from the cable into the flanged condition shown and represented at 25 at which portion it extends into the space between the surface 13 and the inner end of the hollow member 17, the surface of which latter is corrugated as shown.

In the assembling of the parts in Fig. 1, the cap 24, wedge ring 22, and member 17 would be slipped over the left hand end of the cable, with the end of the sheathing 16 extending beyond the left hand end of the member 17. The operator would then by any suitable tool bend the end of the sheathing into overlapping position relative to the adjacent end of the member 17, and the parts thus preliminarily assembled would be applied to the position shown in Fig. 1, the operator by screwing up on the member 17 tightly clamping the flanged portion 25 of the sheathing 16 between the seating surface 13 and the member 17 to form a water-tight joint at this point, and by screwing upon the cap 24 force the clamping ring 22 into rigid engagement with the sheathing 16 for the securing function stated.

The structure shown in Fig. 2 is the same as that of Fig. 1 except that the sheathing 16 instead of being of metal, is of fabric or the like in which case it is preferred that a washer represented at 26 be interposed between the end of the member 17 and the adjacent surface of the flanged portion 25 of the sheathing.

It often happens in practice that the electric cable, sheathed with metal, or not, is contained in a conduit or pipe of relatively rigid material such as for example steel, the structure shown in Fig. 3 being designed for use under such conditions. This structure is the same as that shown in Fig. 1 except that there is provided about the inner surface of the member 17, an annular shoulder 27 from which point the conical surface 21 extends toward the outer end of the member 17 as represented. The steel pipe referred to is represented at 28 and extends into the member 17 and bears at its end against the annular shoulder 27, the clamping ring 22 in this case clamping directly against the pipe 28 for holding the cable in position in the box.

In the construction shown in Fig. 4 the annular seating surface for the end of the rigid pipe 28 is formed by a ring 29 which is interposed between the outwardly turned portion 25 of the sheathing 16, and the inner end of the member 17. The inner diameter of the member 17 at its smaller end, is considerably larger than the internal diameter of the washer 29, adapting a reducer sleeve represented at 30 to be employed, this reducer sleeve being of frusto-conical form and fitting the conical bore of the member 17, the clamping ring 22 in this construction cooperating with the conical inner surface 31 of the reducer sleeve 30 instead of the inner conical surface of the member 17. It will be noted that by this construction, especially by employing washers, the openings through which are of different diameters and reducer sleeves 30 of different thicknesses, the structure is adapted for use with cables and conduits of different sizes.

As regards the feature of providing an abutment for the inner end of the pipe 28, it will be readily understood that this feature may be employed without clamping the inner end of the sheathing, whether it be lead, fabric or other material.

It may also be stated that the feature of providing the reducer sleeve 30 may be employed either with or without the provision of the seating surface for the end of a pipe such as the pipe 28 afforded in the construction shown in Fig. 4 by the inner marginal edge of the washer.

Referring now to the construction shown in Fig. 5 wherein I have shown my invention as embodied in a terminal box, no part of which forms a part of the cable or conduit clamping means, and which box is made, as for example of sheet metal, the box is represented at 32, it being provided in a side wall thereof with an opening 33 through which the cable or conduit and the securing means therefor, extend. The securing means referred to and which constitute one of many embodiments of my invention, are patterned after those shown in Fig. 1, and involve a hollow member 34 of the same construction as the member 17, with a clamping ring 35 like the ring 22 and a compression cap 36 like the cap 24 and operating in the same manner as explained of the latter, the ring 35 surrounding the sheathing 16 which is turned outwardly to present the flange portion 25 at which flange portion it extends between the adjacent end of the member 34 and a companion clamping nipple 37 which has threaded engagement with the member 34, the parts of the clamping device described being rigidly secured to the box 32 by a clamping nut 38 screwed upon the inner end of the member 34 and against the inner side of the apertured box wall, to clamp this wall between this nut and the part 39 of the member 34 and corresponding with the part 20 of the member 17, the member 37 in effect performing the function of the boss-equipped end wall of the box of Fig. 1.

The construction shown in Fig. 6 is the same as that shown in Fig. 5 except that in addition thereto the sheathing 16 is shown as surrounded by a rigid pipe 28, the inner end of the member 34 being formed with a shoulder represented at 40 against which the inner end of the pipe 28 abuts, thereby carrying out the idea presented in Figs. 3 and 4.

By preference the inner surface of the ring 22 is toothed as indicated at 38 in Fig. 7, as by providing the circumferential tooth-forming grooves as shown to enhance the securing function, the showing of such surfacing being omitted in Figs. 1 to 6 inclusive for clearness of illustration.

It may here be stated that the feature of providing an abutment for the pipe in Fig. 6 may be used either with, or without, the feature of clamping outwardly-deflected end portions of the covering for the wires.

While I have illustrated and described certain particular constructions in which my invention may be embodied, I do not wish to be understood as intending to limit it thereto as the invention may be provided in various other forms, and modifications of those shown may be made, without departing from the spirit of my invention.

What I claim as new, and desire to secure by Letters Patent is:

1. A terminal box structure containing an opening, an electric-current-conducting element in said opening and provided with a covering, an end of said covering being deflected outwardly, said box structure presenting portions between which the outwardly deflected portion of said covering is clamped, and means engaging said element outwardly beyond said deflected portion thereof and operating to secure said element in position relative to said box and prevent stress on the outwardly-deflected end of said covering.

2. A terminal box structure containing an opening, an electric-current-conducting element in said opening and provided with a covering, an end of said covering being deflected outwardly, said box structure presenting portions between which the outwardly deflected portion of said covering is clamped, and means located outwardly beyond said deflected portion securing said element in position relative to said box structure comprising a wedging split clamping ring surrounding said element and a relatively stationary surface against which said ring operates.

3. A terminal box containing an opening, an electric-current-conducting element in said opening and provided with a covering one end of which is deflected outwardly, a member registering with said opening and extending beyond the latter and through which said element extends and presenting an outwardly-flaring inner surface, a second member cooperating with said first-named member, between which members the deflected portion of said covering is clamped, and means engaging said outwardly-flaring surface outwardly beyond said deflected portion for securing said element in position relative to the box structure.

4. A terminal box containing an opening, an electric-current-conducting element in said opening and provided with a covering one end of which is deflected outwardly, a member registering with said opening and extending beyond the latter and through which said element extends and presenting an outwardly-flaring inner surface, a second member cooperating with said first-named member, between which members the deflected portion of said covering is clamped, and a split wedging ring surrounding said element and located outwardly beyond said deflected portion and engaging said outwardly-flaring surface and movable lengthwise thereof, for the purpose set forth.

5. A terminal box structure containing an opening, an electric-current-conducting element in said opening and provided with a covering, an end of which is deflected outwardly, said box structure presenting portions between which the outwardly-deflected portion of said covering is clamped, a stationary shoulder adapted to form an abutment for a pipe surrounding said outlet, and means clamping said pipe in contact with said abutment.

6. A terminal box structure containing an opening, an electric-current-conducting element in said opening and provided with a covering, an end of which is deflected outwardly, said box structure presenting portions between which the outwardly-deflected portion of said covering is clamped, one of said portions presenting a stationary shoulder adapted to form an abutment for a pipe surrounding said element, and means clamping said pipe in contact with said abutment.

7. A terminal box structure containing an opening, an electric-current-conducting element in said opening and provided with a covering, an end of which is deflected outwardly, a pipe surrounding said covering, said box structure having a portion opposed by said outwardly-deflected portion of said covering, and a hollow member on said box structure through which said element extends and presenting a surface for flatwise abutting the deflected part of said covering, the outer end of said opening of said hollow member flaring outwardly, and wedge means engaging the flaring wall of said member for clamping the pipe.

8. A terminal box structure containing an opening, an electric-current-conducting element in said opening and provided with a covering, an end of which is deflected outwardly, a pipe surrounding said covering, said box structure having a portion opposed by said outwardly-deflected portion of said covering, and a hollow member on said box structure through which said element extends and presenting a surface for flatwise abutting the deflected part of said covering, and an internal shoulder for abutting the pipe, the outer end of the opening in said hollow member flaring outwardly, and wedge means engaging the flaring wall of said opening for clamping the pipe.

9. A terminal box containing an opening for a covered electric-current-conducting element, a pair of members on said box having screw threaded connections with each other and surrounding said element, one of said members having a shoulder, and a washer surrounding said element between said shoulder and the inner end of the other of said members, the covering for said element being outwardly deflected and interposed, and clamped, between said shoulder and washer.

10. A terminal box containing an opening for an electric-current-conducting element, a member formed separate from said box and secured thereto at said opening and projecting at both ends beyond the wall containing said opening and surrounding said element, a second member on the inner end of first-named member, one of said members presenting a shoulder, said current conducting element being covered, with the end of said covering outwardly deflected and extending into the space between said shoulder and the end of the other of said members and clamped therebetween, and means securing said element in position on said box.

11. A terminal box containing an opening for an electric-current-conducting element, a member formed separate from said box and secured thereto at said opening and projecting at both ends beyond the wall containing said opening and surrounding said element, a second member on the inner end of said first-named member, one of said members presenting a shoulder, said element being covered, with the end of said covering outwardly deflected and extending into the space between said shoulder and the end of the other of said members and clamped therebetween, and a member engaging said first-named member and co-operating therewith to secure said element against displacement.

12. A terminal box containing an opening for an electric-current-conducting element, a member formed separate from said box and secured thereto at said opening and projecting at both ends beyond the wall containing said opening and surrounding said element, a second member on the inner end of said first-named member, one of said members presenting a shoulder, said element being covered, with the end of said covering outwardly deflected and extending into the space between said shoulder and the end of the other of said members and clamped therebetween, and a member engaging the end of said first-named member opposite that which engages said deflected portion, and cooperating with said first-named member to secure said element against displacement.

13. A terminal box structure containing an opening, an electric-current-conducting element located in said opening and provided with a covering, an end of said covering being deflected outwardly, said box structure presenting portions between which the outwardly-deflected end of said covering is clamped, one of said portions being rotatable relative to the other thereof for producing the clamping function, the rotatable one of said portions being provided with an outwardly-flaring opening at which it surrounds said element, and a clamping wedge ring surrounding said element and engaging the wall of said outwardly-flaring opening.

JOHANNES G. A. STRANDELL.